United States Patent
Bremkens et al.

(10) Patent No.: US 11,142,203 B2
(45) Date of Patent: Oct. 12, 2021

(54) COOPERATIVE VEHICLE NAVIGATION

(71) Applicant: Ford Global Technologies, LLC, Dearborn, MI (US)

(72) Inventors: Jan Bremkens, Straelen (DE); Joseph Park, Saint Claire Shores, MI (US); Lodewijk Wijffels, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 715 days.

(21) Appl. No.: 15/442,900

(22) Filed: Feb. 27, 2017

(65) Prior Publication Data
US 2018/0244275 A1 Aug. 30, 2018

(51) Int. Cl.
| | | |
|---|---|---|
| *G08G 1/00* | (2006.01) | |
| *B60W 30/18* | (2012.01) | |
| *G08G 1/16* | (2006.01) | |
| *B60W 30/095* | (2012.01) | |
| *B60W 50/14* | (2020.01) | |

(Continued)

(52) U.S. Cl.
CPC .. *B60W 30/18163* (2013.01); *B60W 30/0956* (2013.01); *B60W 50/14* (2013.01); *G05D 1/0212* (2013.01); *G05D 1/0276* (2013.01); *G05D 1/0289* (2013.01); *G08G 1/0968* (2013.01); *G08G 1/161* (2013.01); *G08G 1/163* (2013.01); *G08G 1/167* (2013.01); *B60W 2540/20* (2013.01); *B60W 2554/4041* (2020.02); *B60W 2554/804* (2020.02);

(Continued)

(58) Field of Classification Search
CPC .......... B60W 30/18163; B60W 30/095; G05D 1/0212; G05D 1/0289; G05D 1/0276; G08G 1/161; G08G 1/0968; G08G 1/16; G08G 1/0965; G08G 1/164; G08G 1/20; G08G 1/202; G08G 1/00
USPC ......................................... 701/96.2
See application file for complete search history.

(56) References Cited

U.S. PATENT DOCUMENTS

| | | | |
|---|---|---|---|
| 7,133,767 B2 | 11/2006 | Ogino et al. | |
| 7,418,346 B2 * | 8/2008 | Breed ..................... | G01S 17/86 701/301 |

(Continued)

FOREIGN PATENT DOCUMENTS

| | | |
|---|---|---|
| CN | 104240535 A | 12/2014 |
| DE | 102012011994 A1 | 12/2013 |

(Continued)

OTHER PUBLICATIONS

Utilizing the ACC-FMCW radar for land vehicles navigation; Ashraf Abosekeen ; Aboelmagd Noureldin ; Michael J. Korenberg; 2018 IEEE/ION Position, Location and Navigation Symposium (PLANS); pp. 124-132; IEEE Conferences. (Year: 2018).*

(Continued)

*Primary Examiner* — Cuong H Nguyen
(74) *Attorney, Agent, or Firm* — Frank A. MacKenzie; Bejin Bieneman PLC

(57) ABSTRACT

A computer is programmed to determine a trajectory of a first vehicle. The computer is programmed to determine whether a second vehicle blocks the trajectory. Upon such determination, the computer sends an instruction to the second vehicle to adjust the second vehicle speed. The computer is programmed to determine the instruction based on the determined trajectory of the first vehicle, a second vehicle location, and a second vehicle speed.

17 Claims, 10 Drawing Sheets

(51) Int. Cl.
*G05D 1/02* (2020.01)
*G08G 1/0968* (2006.01)

(52) U.S. Cl.
CPC ..... *B60W 2556/50* (2020.02); *B60W 2756/10* (2020.02); *G05D 2201/0213* (2013.01)

(56) References Cited

U.S. PATENT DOCUMENTS

| | | | | |
|---|---|---|---|---|
| 7,840,355 | B2* | 11/2010 | Breed | B60W 30/04 |
| | | | | 701/301 |
| 7,843,320 | B2* | 11/2010 | Ponziani | B60Q 11/00 |
| | | | | 340/438 |
| 7,860,639 | B2* | 12/2010 | Yang | G08G 1/081 |
| | | | | 340/901 |
| 7,899,621 | B2* | 3/2011 | Breed | G01S 13/931 |
| | | | | 701/301 |
| 7,990,283 | B2* | 8/2011 | Breed | G01C 21/30 |
| | | | | 340/903 |
| 8,255,144 | B2* | 8/2012 | Breed | G05D 1/0246 |
| | | | | 701/117 |
| 8,892,271 | B2* | 11/2014 | Breed | G08G 1/161 |
| | | | | 701/2 |
| 8,942,864 | B2* | 1/2015 | Nemoto | B60W 30/16 |
| | | | | 701/2 |
| 8,965,677 | B2* | 2/2015 | Breed | G08G 1/163 |
| | | | | 701/301 |
| 9,047,766 | B2 | 6/2015 | Tuukkanen et al. | |
| 9,111,450 | B2 | 8/2015 | Stefan et al. | |
| 9,928,746 | B1* | 3/2018 | MacNeille | G08G 1/0133 |
| 2004/0167717 | A1* | 8/2004 | Buchanan | B60K 31/0008 |
| | | | | 701/301 |
| 2006/0155427 | A1* | 7/2006 | Yang | G08G 1/07 |
| | | | | 701/1 |
| 2008/0059007 | A1* | 3/2008 | Whittaker | G08G 1/22 |
| | | | | 701/2 |
| 2009/0207012 | A1* | 8/2009 | Ponziani | B60Q 9/00 |
| | | | | 340/457 |
| 2013/0066511 | A1* | 3/2013 | Switkes | G08G 1/166 |
| | | | | 701/28 |
| 2013/0116861 | A1* | 5/2013 | Nemoto | B60W 30/16 |
| | | | | 701/2 |
| 2014/0303870 | A1* | 10/2014 | Switkes | G08G 1/166 |
| | | | | 701/96 |
| 2015/0039213 | A1 | 2/2015 | Stefan et al. | |
| 2016/0231747 | A1 | 8/2016 | Neff | |
| 2016/0357187 | A1* | 12/2016 | Ansari | G01S 15/931 |
| 2016/0357188 | A1* | 12/2016 | Ansari | G05D 1/0212 |
| 2016/0357262 | A1* | 12/2016 | Ansari | G06F 3/017 |
| 2016/0358477 | A1* | 12/2016 | Ansari | G08G 1/167 |
| 2017/0361762 | A1* | 12/2017 | Wunsche, III | G08G 1/22 |
| 2018/0082590 | A1* | 3/2018 | MacNeille | G08G 1/0133 |

FOREIGN PATENT DOCUMENTS

| | | |
|---|---|---|
| DE | 102014215980 A1 | 2/2016 |
| GB | 2556404 A | 5/2018 |
| JP | 2000306194 A | 11/2000 |
| JP | 4742547 B2 | 5/2011 |
| JP | 2016126701 A | 7/2016 |
| WO | 2017174601 A1 | 10/2017 |

OTHER PUBLICATIONS

GB Search Report dated Aug. 20, 2018 re GB Appl. No. 1802993.4.
CN Notification of First Office Action dated Jun. 4, 2021 re Appl. No. 201810153720X.

* cited by examiner

COOPERATIVE VEHICLE NAVIGATION

BACKGROUND

When a vehicle changes its driving lane, there is often a risk of a collision with an object, e.g., another vehicle. A driver of the vehicle may initiate a lane change without recognizing or attempting to mitigate a collision risk, e.g., where another vehicle is in a blind spot of the driver. In another example, a plurality of lane changes may be necessary, e.g., when a vehicle intends to leave a multi lane highway, which may increase a risk of collision compared to a single lane change. Heavy traffic, e.g., when a plurality of lane changes is necessary, may even lead to deviating from an intended route, e.g., missing a highway exit.

DETAILED DESCRIPTION

Introduction

Figure 1:
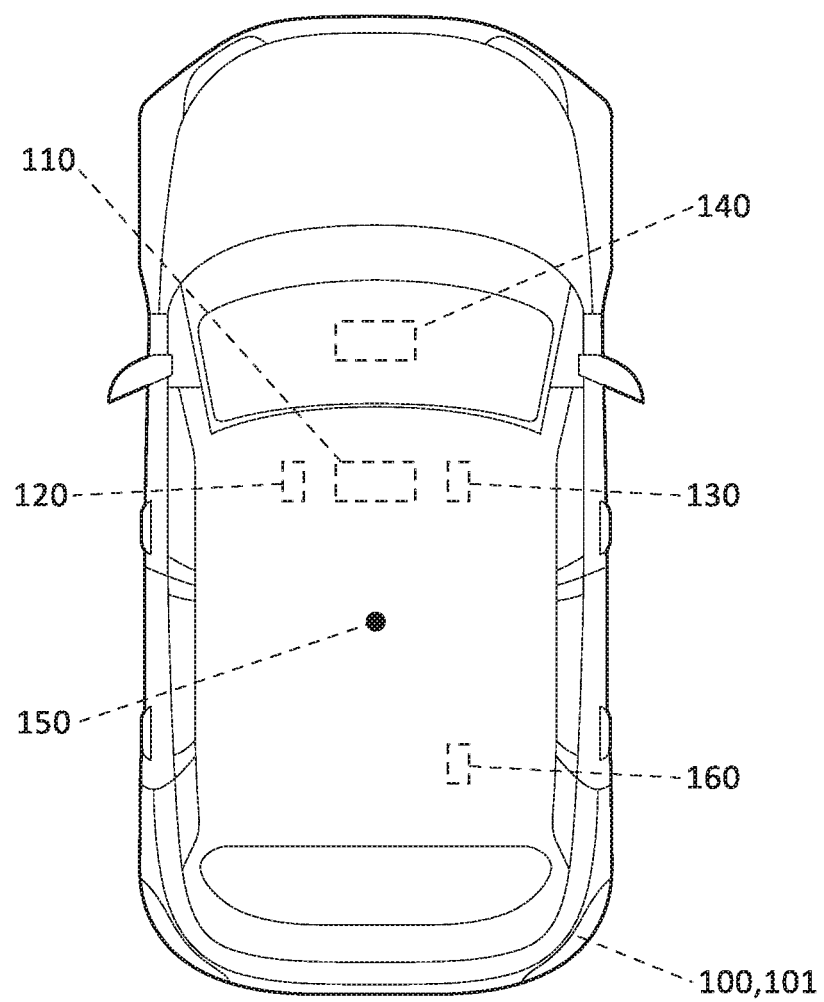
FIG. 1 is a diagram illustrating an example vehicle system.

Disclosed herein is a vehicle 100 computer 110 that is programmed to determine a trajectory 230 of a first vehicle 100, e.g., to change from a lane 210a to a lane 210c. The computer 110 is programed to determine whether a second vehicle 101 blocks the determined trajectory 230 of the first vehicle 100. Upon such determination, the computer 110 sends an instruction to the second vehicle 101 to adjust the second vehicle 101 speed. The computer 110 is programmed to determine the instruction based on the determined trajectory 230 of the first vehicle 100, a second vehicle 101 location, and a second vehicle 101 speed.

The computer 110 may be programmed send the instruction where the instruction is further based on a first vehicle 100 speed and a first vehicle 100 location.

The computer 110 may be further programmed to determine the second vehicle 101 speed and the second vehicle 101 location based on data received from first vehicle 100 sensors.

The computer 110 may be programmed to determine the trajectory 230 of the first vehicle 100 wherein the determined trajectory 230 includes a lateral lane 210 change.

The computer 110 may be programmed to determine the trajectory 230 wherein the determined trajectory 230 of the first vehicle 100 includes a curvature intersecting at least one road 250 lane 210 marking 220.

The computer 110 may be programmed to determine the trajectory 230 based on a predetermined route.

The computer 110 may be programmed to determine the trajectory 230 based on activation of a first vehicle 100 turn signal.

The computer 110 may be programmed to, upon receiving a refusal from the second vehicle 101 to modify its speed, determine a second trajectory 230 of the first vehicle 100. The computer 110 may be programmed to identify a third vehicle 101 that blocks the second trajectory 230, and send, to the third vehicle 101, a second instruction to adjust a third vehicle 101 speed based on the second trajectory 230, a second vehicle 101 location, and a second vehicle 101 speed.

The computer 110 may be programmed to send a plurality of instructions to a plurality of second vehicles 101, wherein each of the instructions is associated with one of the plurality of second vehicles 101 and is based at least on a speed and a location of the respective second vehicle 101.

As disclosed herein is a method comprising determining a trajectory 230 of a first vehicle 100 movement. The method may further include, upon determining that a second vehicle 101 blocks the determined trajectory 230, sending, to the second vehicle 101, an instruction to adjust a second vehicle 101 speed, based on the determined trajectory 230 of the first vehicle 100, a second vehicle 101 location, and a second vehicle 101 speed. The method may further include receiving, in the second vehicle 101, the instruction to adjust the second vehicle 101 speed to a target speed, and applying the received instruction by actuating second vehicle 101 operations at least in part based on the received instruction.

The method may comprise determining a trajectory 230 of a first vehicle 100, and upon determining that a second vehicle 101 blocks the determined trajectory 230, sending, to the second vehicle 101, an instruction, based on the determined trajectory 230 of the first vehicle 100, a second vehicle 101 location, and a second vehicle 101 speed, to adjust the second vehicle 101 speed.

The method may further comprise sending the instruction that is based on a first vehicle 100 speed and a first vehicle 100 location.

The method may further comprise determining the second vehicle 101 speed and the second vehicle 101 location based on data received from first vehicle 100 sensors.

The method may comprise determining the trajectory 230 of the first vehicle 100 wherein the determined trajectory 230 of the first vehicle 100 includes a lateral lane change.

The method may comprise determining the trajectory 230 of the first vehicle 100 wherein the determined trajectory 230 of the first vehicle 100 includes a curvature intersecting at least one road 250 lane marking 220.

The method may further comprise determining the trajectory 230 based on a predetermined route.

The method may further comprise determining the trajectory 230 based on activation of a first vehicle 100 turn signal.

The method may further comprise, upon receiving a refusal from the second vehicle 101 to modify its speed, determining a second trajectory 230 of the first vehicle 100, identifying a third vehicle 101 that blocks the second trajectory 230, and sending, to the third vehicle 101, a second instruction to adjust a third vehicle 101 speed based on the second trajectory 230, a second vehicle 101 location, and a second vehicle 101 speed.

The method may further comprising sending a plurality of instructions to a plurality of second vehicles 101, wherein each of the instructions is associated with one of the second vehicles 101 and is based at least on a speed and a location of the respective second vehicle 101.

The method may further comprise receiving, in the second vehicle 101, the instruction from the first vehicle 100, determining, in the second vehicle 101, whether to accept the received instruction based on at least on one of a second vehicle 101 target speed and a time-to-collision of the first vehicle 100. The method may further comprise, upon determining that the received instruction is acceptable, actuating a second vehicle 101 actuator based on the received instruction.

For convenience herein, the vehicle 100 may be referred to as a first or host vehicle 100, and the second vehicle 101 may be referred to as a second or client vehicle 101. FIG. 1 illustrates elements included in the host vehicle 100. However, a host vehicle 100 and a client vehicle 101 may have like elements, and to avoid repetition a separate block diagram of the vehicle 101 is not provided but it is to be understood that the elements shown in FIG. 1 may also be included in a vehicle 101, including a computer 110, actuators 120, sensors 130, a human machine interface (HMI) 140, and/or a wireless communication interface 160 each of which are discussed in more detail below.

Exemplary System Elements

FIG. 1 illustrates a vehicle 100. The vehicle 100 may be powered in a variety of ways, e.g., with an electric motor and/or internal combustion engine. The vehicle 100, 101 is a land vehicle such as a car, truck, etc. Additionally or alternatively, the vehicle 100, 101 may include a bike, e.g., a motorcycle. A vehicle 100, 101 may include a computer 110, actuator(s) 120, sensor(s) 130, an HMI 140, and a wireless communication interface 160. A vehicle 100, 101 has a geometrical center point 150, e.g., points at which respective longitudinal and lateral center lines of the vehicle 100 intersect.

The computer 110 includes a processor and a memory such as are known. The memory includes one or more forms of computer-readable media, and stores instructions executable by the computer 110 for performing various operations, including as disclosed herein.

The computer 110 may operate the respective vehicle 100 in an autonomous, a semi-autonomous mode, or a non-autonomous (or manual) mode. For purposes of this disclosure, an autonomous mode is defined as one in which each of vehicle 100 propulsion, braking, and steering are controlled by the computer 110; in a semi-autonomous mode the computer 110 controls one or two of vehicles 100 propulsion, braking, and steering; in a non-autonomous mode a human operator controls each of vehicle 100 propulsion, braking, and steering.

The computer 110 may include programming to operate one or more of land vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 100 communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 100 network, the computer 110 may transmit messages to various devices in the vehicle and/or receive messages from the various devices, e.g., an actuator 120, an HMI 140, etc. Alternatively or additionally, in cases where the computer 110 actually comprises a plurality of devices, the vehicle 100 communication network may be used for communications between devices represented as the computer 110 in this disclosure. Further, as mentioned below, various controllers and/or sensors may provide data to the computer 110 via the vehicle communication network.

In addition, the computer 110 may be configured for communicating through a vehicle-to-vehicle (V-to-V) wireless communication interface 160 with other vehicles 101, e.g., via a vehicle-to-vehicle communication network. The V-to-V communication network represents one or more mechanisms by which the computers 110 of vehicles 100 may communicate with other vehicles 101, and may be one or more of wireless communication mechanisms, including any desired combination of wireless (e.g., cellular, wireless, satellite, microwave and radio frequency) communication mechanisms and any desired network topology (or topologies when a plurality of communication mechanisms are utilized). Exemplary V-to-V communication networks include cellular, Bluetooth, IEEE 802.11, dedicated short range communications (DSRC), and/or wide area networks (WAN), including the Internet, providing data communication services.

The vehicle 100 actuators 120 are implemented via circuits, chips, or other electronic and or mechanical components that can actuate various vehicle subsystems in accordance with appropriate control signals as is known. The actuators 120 may be used to control braking, acceleration, and steering of the vehicles 100. For example, in a semi-autonomous mode, the computer 110 may actuate a steering actuator 120 to change a vehicle lane upon receiving a user request from a human operator to change the lane (see FIG. 2).

The sensors 130 may include a variety of devices known to provide data to the computer 110. For example, the sensors 130 may include Light Detection And Ranging (LIDAR) sensor(s) 130 disposed on a top of the vehicle 100 that provide relative locations, sizes, and shapes of the second vehicles 101 surrounding the vehicle 100, including the second vehicles 101 travelling next to or behind the vehicle 100 (see FIGS. 2A-2C). As another example, one or more radar sensors 130 fixed to vehicle 100 bumpers may provide locations of the second vehicles 101 travelling in front, side, and/or rear of the vehicle 100, relative to the location of the vehicle 100. The sensors 130 may further alternatively or additionally include camera sensor(s) 130, e.g. front view, side view, etc., providing images from an area surrounding the vehicle 100. For example, the computer 110 may be programmed to receive image data from the camera sensor(s) 130 and to implement image processing techniques to detect lane markings 220, lane(s) 210a, 210b, 210c, and other objects such as vehicles 101.

The computer 110 may be further programmed to determine a current driving lane 210a of the vehicle 100, e.g., based on global positioning system (GPS) coordinates and/or detected lane markings 220. Based on data received from the sensors 130, the computer 110 may determine a relative distance, speed, etc. of other vehicles 101 relative to the vehicle 100. As another example, the computer 110 may be programmed to receive data including relative speed, location coordinates, and/or direction of other vehicles 101 via the wireless communication network. For example, the computer 110 may receive such data from GPS sensors disposed in other vehicles 101 that provides geographical coordinates, movement direction, speed, etc., of the second vehicles 101.

The HMI 140 may be configured to receive input from a human operator during operation of the vehicle 100. Moreover, an HMI 140 may be configured to display, e.g., via visual and/or audio output, information to the user. Thus, an HMI 140 may be located in the passenger compartment of the vehicle 100 and may include one or more mechanisms for user input. For example, the HMI 140 may include a turn signal switch. In an example non-autonomous mode, the computer 110 may receive a request to change the lane 210, e.g., a turn left signal to indicate an intention of vehicle 100 user to change from a current lane 210a to a target lane 210b.

In an example semi-autonomous mode, the computer 110 may be programmed to perform the lane change upon receiving an entry from the user, e.g., via the turn signal switch, touch screen, etc. In other words, the computer 110 may be programmed to execute a lane change but only if a vehicle 100 user confirms a change of the current lane 210a.

The computer 110 may be programmed to receive a destination, e.g., location coordinates, via the HMI 140, and determine a route from a current location of the vehicle 100 to the received destination. The computer 110 may be programmed to operate the vehicle 100 in an autonomous mode from the current location to the received destination based on the determined route.

For example, the computer 110 may be programmed to determine that a lane change is needed to exit a freeway to follow the determined route. In another example, the vehicle 100 user may cause a lane change while the vehicle is operated in a non-autonomous mode, based on data outputted on the vehicle 100 HMI 140, e.g., a visual and/or audio request to turn right or left. In another example, the computer 110 may be programmed to determine that a lane change is needed to prevent a collision of the host vehicle 100 with an obstacle on the host vehicle 100 current lane 210. For example, the computer 110 may be programmed to determine that a lane change needed upon determining that a time-to-collision with an obstacle on the current lane 210 of the host vehicle 100 is less than a time to stop the vehicle 100 by braking. In this example, the computer 110 could be programed to determine the time-to-collision based on a speed and acceleration of the host vehicle 100, and a distance between the host vehicle 100 and the obstacle. The computer 110 may be programmed to determine a time-to-stop the host vehicle 100 based on the speed and acceleration of host vehicle 100, and a predetermined maximum deceleration provided by the vehicle 100 braking actuator 120.

Figure 2A:
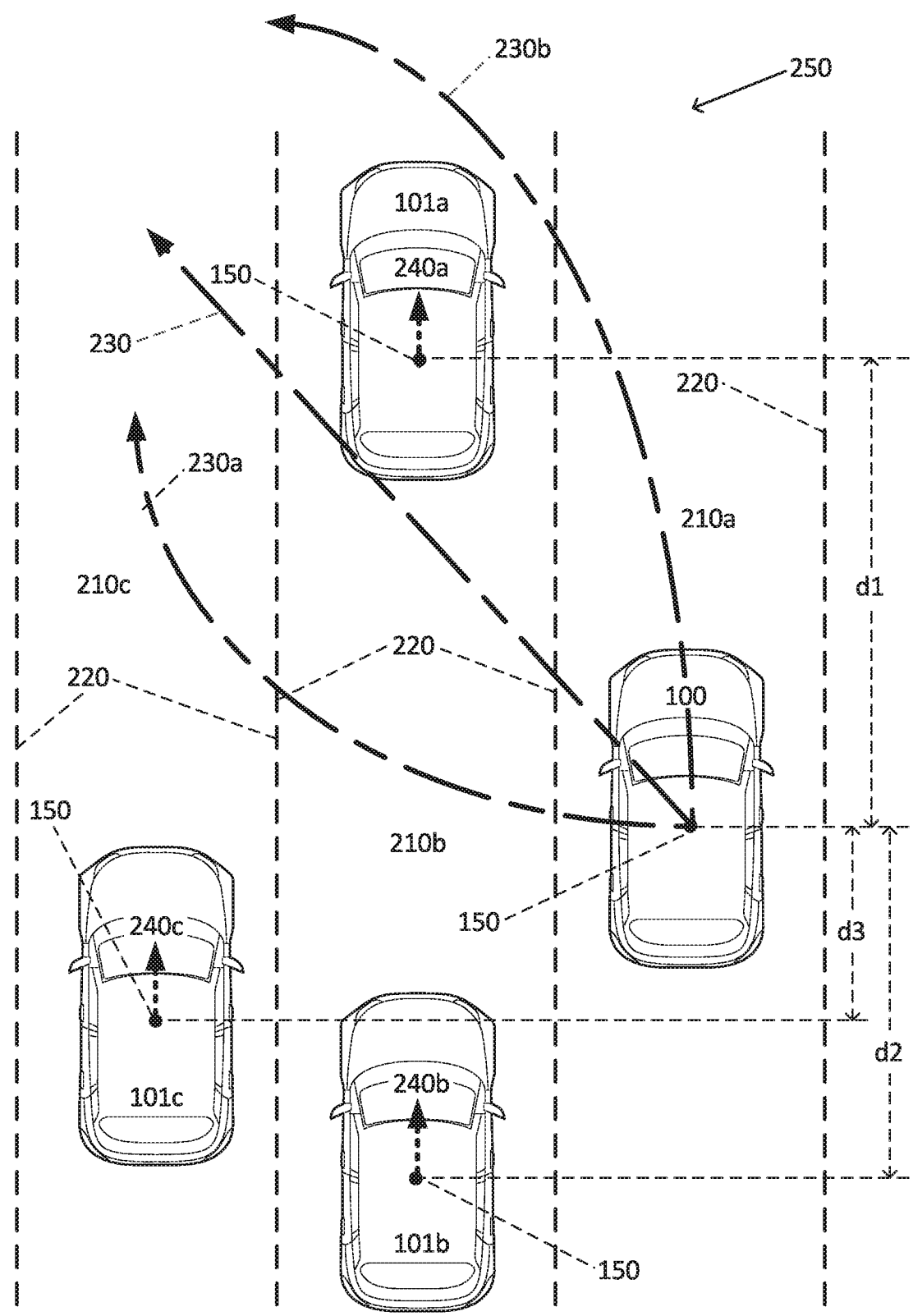
FIG. 2A is a diagram showing an example of a plurality of vehicles driving in a plurality of lanes.
Figure 2B:
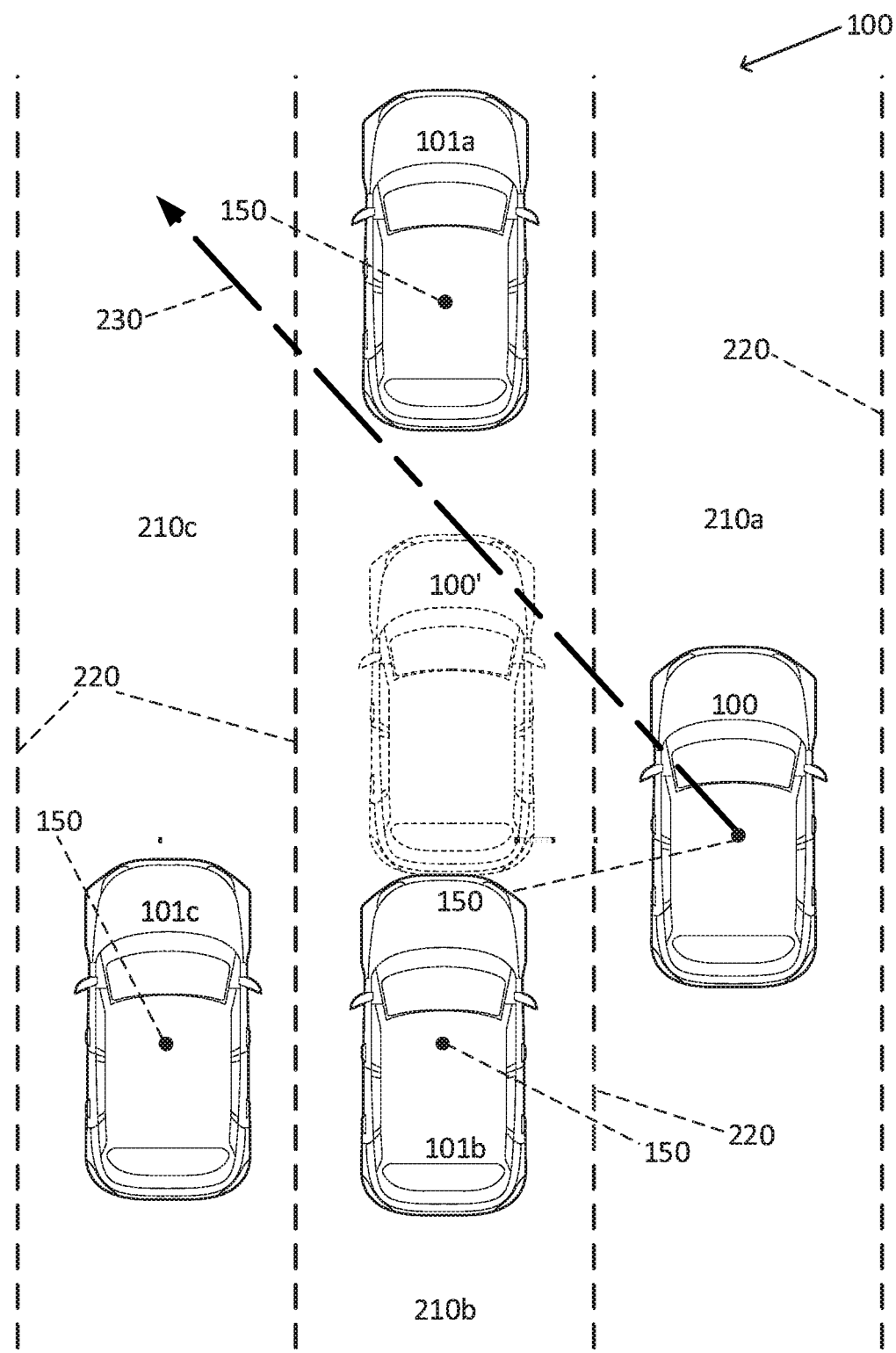
FIG. 2B-2D are diagrams showing various lane change scenarios for a vehicle of FIG. 2A.
Figure 2C:
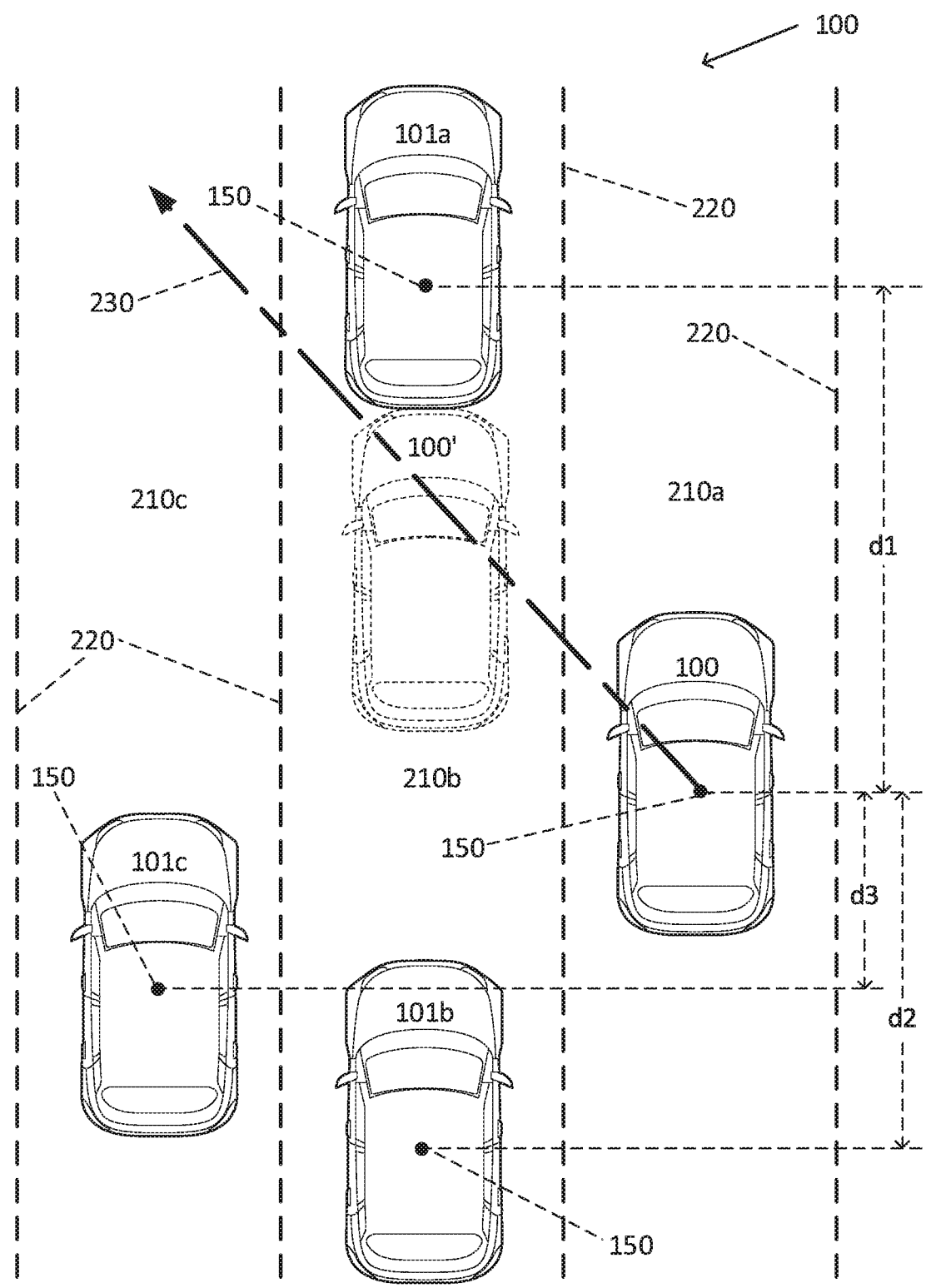

With reference to FIG. 2A-2C, the vehicle 100 computer 110 may be programmed to determine, e.g., a trajectory 230, of the first vehicle 100. Upon determining that, e.g., a second vehicle 101a, blocks the determined trajectory 230, the computer 110 may send an instruction to the second vehicle 101a to adjust its speed. The computer 110 may be programmed to determine the instruction based on the determined trajectory 230 of the first vehicle 100, a second vehicle 101a location, and/or a second vehicle 101a speed.

A trajectory, e.g., a trajectory 230, 230a, 230b, 240, 240a, 240b, 240c, in the context of present disclosure refers to an expected or projected movement path of a vehicle 100, 101 starting from a current location of the vehicle 100, 101 and extending for at least a predetermined distance, e.g., 100 meters, ahead of the vehicle 100, 101. The computer 110 may be programmed to actuate vehicle 100, 101 actuators 120 to navigate the vehicle 100, 101 on the trajectory, e.g., by accelerating, braking, steering. The respective trajectories 230, 240 of vehicles 100, 101 may include curves and/or straight lines on a ground surface, e.g., a road 250.

As another example, a trajectory 240a of a vehicle 101a that moves in a lane 210b may follow a curvature of a lane 210b. A movement of a vehicle 100, 101 on a trajectory may include a longitudinal and a lateral movement. A longitudinal movement may refer to a movement parallel to a straight edge of a lane 210, or parallel to a tangent to a closest point of the lane 210 edge where the edge is curved. A lateral movement is perpendicular to a longitudinal movement. A road 250 may include various number of lanes 210. A lane change may include a lateral movement of a vehicle 100, 101.

A trajectory 230 may include a lane change caused by movement of the vehicle 100 having a lateral component. For example, the computer 110 may be programmed to determine the trajectory 230 based on a predetermined vehicle 100 route that includes exiting a current multi-lane road 250 via an exit that is accessible through a lane 210c. Thus, the computer 110 may be programmed to cause a plurality of lane changes to move the vehicle 100 from the lane 210a to the lane 210c. Thus, a trajectory 230 may intersect one or more lane markings 220 and end in, e.g., a target lane 210c. For example, as shown in FIG. 2A, the trajectory 230 intersects two lane markings to move the vehicle 100 from the lane 210a to the target lane 210c.

With reference to FIGS. 2A-2B, a movement of the vehicle 100 on the trajectory 230 may cause an impact to the second vehicle 101b. FIG. 2B shows that, when the vehicle 100 changes to the lane 210b based on the trajectory 230 and is positioned in a location where is illustrated by a virtual vehicle 100', the vehicles 100, 101b may impact one another. Thus, the host vehicle 100 computer 110 may be programmed to determine that the second vehicle 101b blocks the trajectory 230. The computer 110 may be programmed to send a speed decrease instruction to the second vehicle 101b. The second vehicle 101b computer 110 may be programmed to reduce the second vehicle 101b speed based on the received instruction. The decrease of speed of the second vehicle 101b may prevent that the second vehicle 101b blocks the trajectory 230.

As another example, FIG. 2C shows that, when the vehicle 100 changes from the lane 210a to the lane 210b based on the trajectory 230, and is positioned in a location where is illustrated by vehicle 100', the vehicles 100, 101a may impact one another. For example, the vehicle 100 may impact a rear end and/or a side of vehicle 101a. The vehicle 100 computer 110 may be programmed to send a speed increase instruction to the second vehicle 101a. The second vehicle 101a computer 110 may be programmed to increase the second vehicle 101a speed based on the received instruction.

The host vehicle 100 computer 110 may be programed to determine the instruction based on a speed and/or location of the host vehicle 100, a speed and/or location of second vehicles 101 such as vehicles 101a, 101b, 101c, proximate to the host vehicle 100, as discussed below. "Proximate" in the context of present disclosure refers to an area within a predetermined detection distance of the host vehicle 100. The predetermined detection distance may be constant, e.g., 100 meters, or may depend on a maximum allowed speed of vehicles 100, 101 in a current location of the host vehicle 100. For example, in a road 250 with a speed limit of 130 km/hr the predetermined detection distance may be 100 meters, whereas a predetermined distance in a road 250 with a speed limit of 30 km/hr may be 25 meters.

In one example, the vehicle 100 computer 110 is programmed to determine the speed and/or location of the second vehicles 101 proximate to the host vehicle 100 based on data received from the vehicle 100 sensors 130 such as a LIDAR sensor 130. Additionally or alternatively, the vehicle 100 computer 110 may determine the speed and/or location of the second vehicles 101 based on data received via the wireless communication interface 160, e.g., from second vehicles 101 sensors 130.

Figure 2D:
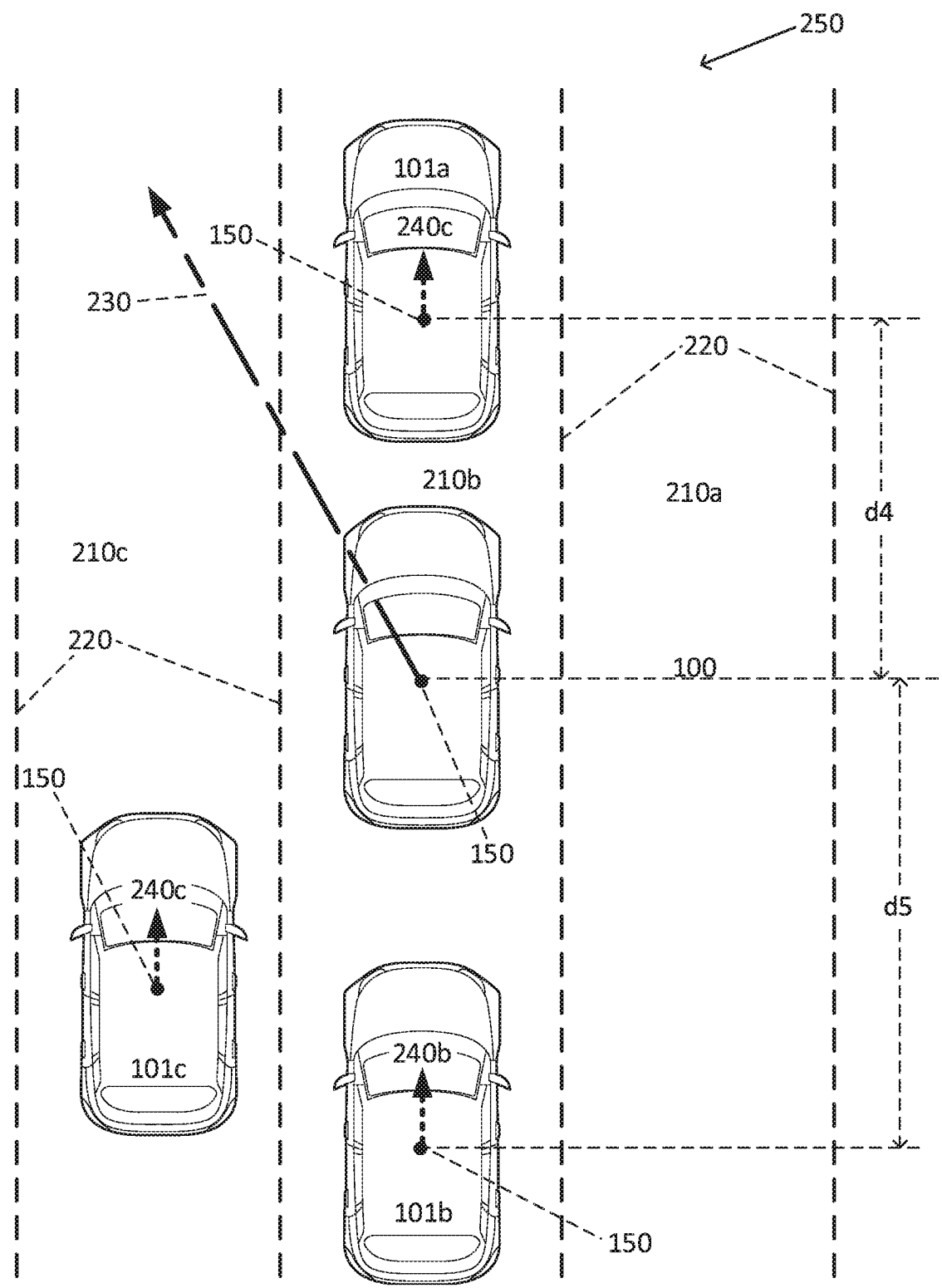

As shown in FIG. 2D, the vehicle 100 moving along the trajectory 230 may enter the second lane 210b in a location shown by vehicle 100'. Upon entry of the vehicle 100 to the lane 210b, the vehicle 100 may have distances $d_4$, $d_5$ from the second vehicles 101a, 101b. The vehicle 100 computer 110 may be programmed to determine the instructions to increase and/or reduce speed of the second vehicles 101a, 101b such that the distances $d_4$, $d_5$ exceed a predetermined threshold, e.g., 25 meters. For example, the vehicle 100 computer 110 may determine the instructions to reduce the speed of the second vehicle 101b such that the distance $d_3$ exceeds the predetermined threshold.

Additionally or alternatively, the vehicle 100 computer 110 may increase the vehicle 100 speed such that the distance $d_3$ when vehicle 100 enters the lane 210b exceeds the predetermined threshold. The vehicle 100 computer 110 may determine the instruction based on the longitudinal distances $d_1$, $d_2$ of vehicle 100 and the second vehicles 101 prior to entering the second lane 210b, speed and location of the vehicles 100, 101, the trajectory 230, etc.

Further additionally or alternatively, the computer 110 may determine the instruction based on (a) projected change(s) of speed of one or more second vehicle 101. For example, if an increase of the second vehicle 101b is projected (e.g., planned by the second vehicle 101 computer 110), a distance $d_3$ upon entrance of the vehicle 100 to the second lane 210b may be shorter compared to another scenario in which no increase of the second vehicle 101b is projected. In one example, the vehicle 100 computer 110 may receive a projected speed of the second vehicle 101, e.g., via the wireless communication interface 160. The vehicle 100 computer 110 may be programmed to determine the threshold based on the speed of the vehicle 100 and/or second vehicles 101, e.g., 50 meters for 100 (kilometer per hour) km/h, 25 meters for 50 km/h, etc.

Figure 3:
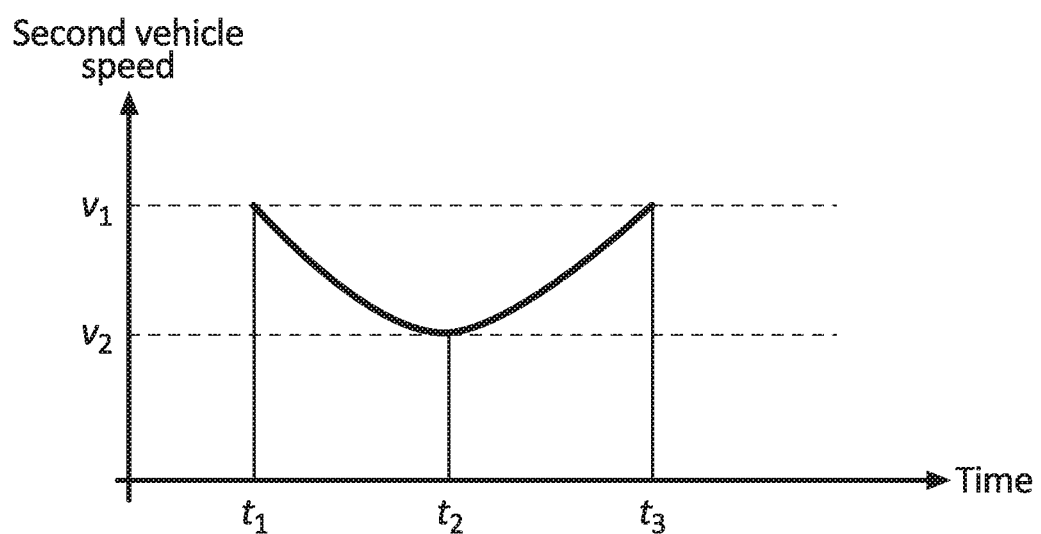
FIG. 3 is an example graph showing a change of a vehicle speed over time.

The computer 110 may be programmed to send an instruction to the second vehicle 101 to modify the second vehicle 101 speed, e.g., to 20 km/hr. Additionally or alternatively, as shown in FIG. 3, the vehicle 100 computer 110 may be programmed to send an instruction including a target speed pattern to the second vehicle 101b to change the second vehicle 101b speed based on the pattern. For example, the computer 110 may send an instruction to the second vehicle 101b indicating that the second vehicle 101 speed may start to reduce at time $t_1$ and reach a speed $v_2$ at time $t_2$. This may cause an increase in a space (distance) between the vehicles 101a, 101b that unblocks the trajectory 230. Additionally, the computer 110 may be programmed to send an instruction including a target speed pattern to the second vehicle 101b indicating that the second vehicle 101b may resume the speed $v_1$ at time $t_3$.

Additionally, the computer 110 may be programmed to send one or more notifications to other second vehicles 101 proximate to the host vehicle 100 that are not instructed to modify their speed, indicating that one or more second vehicles 101 speed is being modified based on instructions transmitted by the host vehicle 100 computer 110. For example, the computer 110 may send notifications to the second vehicles 101a, 101c indicating that the host vehicle 100 requested a modification of the second vehicle 101b speed. In another example, the computer 110 may broadcast a message including a notification about modifying a speed of a selected second vehicle 101b.

In another example, the computer 110 may periodically send, e.g., every 50 milliseconds (ms), an instruction including a target speed based on the graph shown in FIG. 3. In yet another example, the computer 110 may send a list of target speed values $v_1$, $v_2$, $v_1$ associated with times $t_1$, $t_2$, $t_3$, based on a target speed pattern. The second vehicle 101 computer 110 may interpolate the target speed value for times between the times $t_1$, $t_2$, and $t_3$, based on the received list of target speeds $v_1$, $v_2$, $v_1$ and times $t_1$, $t_2$, $t_3$. A time interval of $t_1$ to $t_3$ may be referred to as a control session, i.e., a time interval in which a speed of a second vehicle 101 is controlled by a host vehicle 100 computer 110 rather than a second vehicle 101 computer 110. Thus, after $t_3$, the second vehicle 101 may resume controlling of the second vehicle 101 speed. In one example, a control session may end based on a message from the host vehicle 100 to the second vehicle 101 indicating an end of the control session.

The vehicle 100 computer 110 may be programmed to determine the trajectory 230 based on a predetermined route, e.g., based on a predetermined destination. Additionally or alternatively, the computer 110 may be programmed to determine a trajectory based on an activation of a vehicle 100 turn signal, e.g., via the HMI 140. For example, based on activation of a left turn signal, the computer 110 may determine a trajectory 230. The computer 110 may be programmed to determine a plurality of possible trajectories 230, 230a, 230b, and then to identify a trajectory, e.g., the trajectory 230a, that is not blocked by a second vehicle 101. Specifically, the computer 110 may be programmed to determine a plurality of trajectories by changing longitudinal and lateral components of vehicle 100 speed included in a trajectory.

The computer 110 may be further programmed to select one of the possible trajectories based on various selection criteria. Initially, the computer 110 is typically programmed to ignore any trajectory 230 that is blocked. Further, the computer 110 may be programmed to select a trajectory 230 based on which trajectory 230 may result in modifying a speed of a least number of second vehicles 101 and/or which results in a least aggregate speed modification to second vehicles 101, as described below with reference to FIG. 4. The computer 110 then navigates the vehicle 100 in an autonomous, semi-autonomous, or non-autonomous mode based on the identified trajectory 230a. In one example, moving the vehicle 100 on a trajectory 230a may include a lateral movement which may lead to a need for reducing the second vehicle 101b speed. In this example $d_3$ may be 5 meters, thus with a lateral movement of the vehicle 100 to the lane 210b, the second vehicle 101b would be instructed to reduce its speed to ensure that the distance $d_4$ exceeds the distance threshold, e.g., 25 meters (see FIG. 2D). The computer 110 could take this speed modification in the second vehicle 101 in selecting the trajectory 230a for the host vehicle 100.

With reference to above described examples of trajectories 230, the computer 110 may be programmed to determine possible trajectories 230 based on various inputs including current locations of vehicles 100, 101, projection of vehicles 101 speed, lane 210 curvature, target lane 210 and/or target location such as a highway exit ramp. Various techniques may be used for determining possible trajectories based on above described inputs. As one example, the computer 110 may use a dynamic state space model, such as is known, to determine possible trajectories. A state-space model is a mathematical model of a physical system, e.g., the vehicles 100, 101, and includes a set of inputs, outputs such as possible trajectories, and state variables. For example, state variables may be related by first-order differential equations.

The computer 110 may be programmed to determine possible trajectories by receiving a state space model of the vehicles 100, 101, map data including road 250 curvature, and the inputs described above. Additionally, the computer 110 may be programmed to determine instructions that cause the vehicle 100 to move on each of the determined possible trajectories. For example, the computer 110 may be programmed to determine instructions to accelerate, brake, and/or steer the vehicle 100 to stay on a respective trajectory.

The computer 110 may be programmed to determine possible trajectories based on specific limitations and/or optimization criteria. For example, the computer 110 may be programmed based on a model that implements the limitations and/or optimization criteria. Possible limitations may include a maximum time and/or maximum distance threshold to finish a lane change. The limitations may include a maximum or minimum allowed speed in the current location. The limitations may include vehicle 100, 101 physical attributes such as maximum available longitudinal and/or lateral acceleration, e.g., based on vehicle 100 engine power. The limitations may include maximum available deceleration, e.g., based on brake system attributes. The limitations may include environmental conditions, e.g., a reduced road 250 surface friction coefficient due to inclement weather, and/or loading conditions of a vehicle 100, 101. Possible optimization criteria may include minimizing specific parameters caused by the host vehicle 100 instructions. For example, the optimization criteria may include minimizing acceleration and/or deceleration of second vehicles 101 based on the host vehicle 100 instructions. In another example, for improved fuel economy, the optimization criteria may include minimizing longitudinal acceleration. In yet another example, for improved comfort, the optimization criteria may include minimizing a lateral acceleration, deceleration, and/or roll of the vehicles 100, 101.

As another example, the computer 110 may be programmed to send a plurality of instructions to a plurality of second vehicles 101. Each of the instructions may be associated with one of the second vehicles 101 and may be based on a speed and a location of the respective second vehicle 101. For example, the computer 110 may send instructions to the second vehicles 101b, 101c to decrease speed to unblock the trajectory 230. The computer 110 may send a speed decrease instruction to the second vehicle 101b and a speed increase instruction to the second vehicle 101a to ensure that both distances $d_4$ and $d_5$ exceed the predetermined distance threshold.

Upon receiving an instruction from the host vehicle 100, a second vehicle 101 may accept to apply the received instruction and send an acknowledgement reply, or may refuse to modify its speed based on the received instruction and send a refusal reply to the host vehicle 100. The host vehicle 100 computer 110 may determine that the second vehicle 101b refuses to modify its speed based on the reply received from the second vehicle 101 or based on data received from the vehicle 100 sensors 130, e.g., determining a lack of an expected change in the second vehicle 101 speed. Upon receiving a refusal from the second vehicle to modify its speed, the vehicle 100 computer 110 may be programmed to determine a second trajectory 230a, 230b of the host vehicle 100. The computer 110 may be further programmed to identify a second vehicle 101a that blocks the second trajectory 230b, and send a second instruction to adjust the second vehicle 101a speed based on the second trajectory 230b, a second vehicle 101a location, and a second vehicle 101a speed.

The second vehicle 101 computer 110 may be programmed to apply the received instruction upon determining that the received instruction is acceptable. The second vehicle 101 computer 110 may be programmed to determine whether the received instruction is acceptable by determining whether executing the received instruction is predicted to cause an impact with another vehicle 101 and/or an obstacle, and/or is predicted to cause the second vehicle 101 to depart from an expected path. For example, the second vehicle 101 computer 110 may determine whether the received instruction is acceptable by determining that the target speed is within an expected speed range, e.g., maximum allowed speed in the current location of the second vehicle 101. Additionally or alternatively, the expected speed range may further be based on current weather conditions. For example, the expected speed range may be limited, e.g., 80 km/hr, to less than a normally maximum allowed speed limit, e.g., 100 km/h, due to inclement weather conditions.

As another example, the second vehicle 101 computer 110 may determine whether the received instruction is acceptable based on a maximum expected acceleration threshold. For example, the computer 110 may be programmed to refuse an instruction with a target speed that causes an acceleration of more than 5 meter per second squared (m/s$^2$). For example, with reference to FIG. 3, the second vehicle 101 computer 110 may refuse an instruction with a target speed of 30 km/hr, when the difference between $t_1$ and $t_2$ is 2 seconds and a current speed of the second vehicle 101 is 70 km/hr.

The vehicle 100 computer 110 may be programmed to send the instruction including an identifier, e.g., license plate number, of the second vehicle 101 and a second vehicle 101 target speed value. The second vehicle 101 computer 110 may be programmed to determine that the received instruction is associated with the second vehicle 101 based on the identifier included in the received instructions. The second vehicle 101 computer 110 may be programmed to apply the received instruction by actuating second vehicle 101 operations based on the received instruction.

In one example, the second vehicle 101 computer 110 may periodically receive instructions, e.g., every 50 ms, from the host vehicle 100 to modify the second vehicle 101 speed. In other words, the host vehicle 100 computer 110 may be programmed to periodically send an instruction to the second vehicle 101b, e.g., from a time that a lane change to the lane 210b starts until the host vehicle 100 is located in the second lane 210b and a distance $d_4$ between the vehicles 100, 101b exceeds the predetermined threshold.

Processing

Figure 4A:
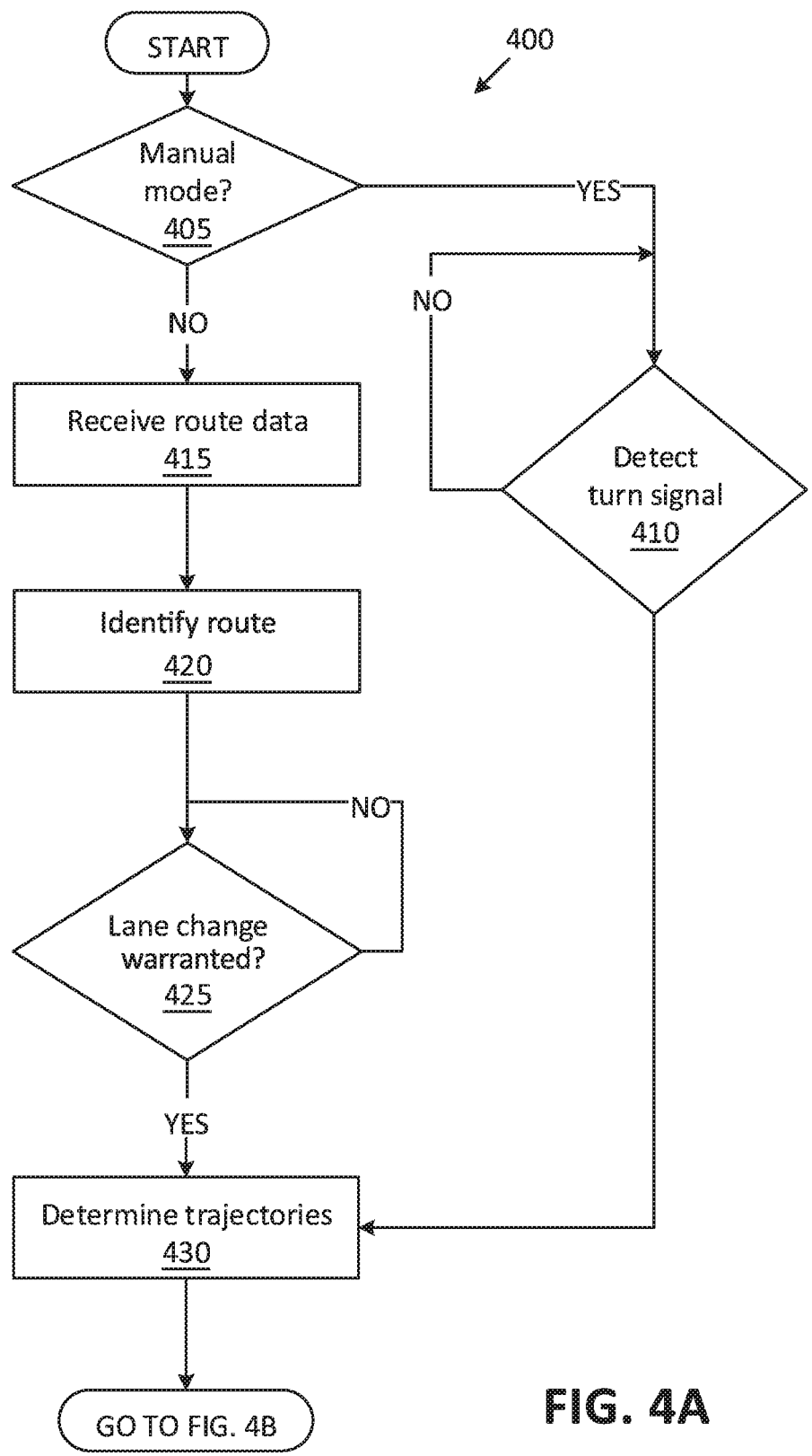
FIGS. 4A-4C are a flowchart of an exemplary process for host vehicle sending instructions to other vehicle for unblocking a path.
Figure 4B:
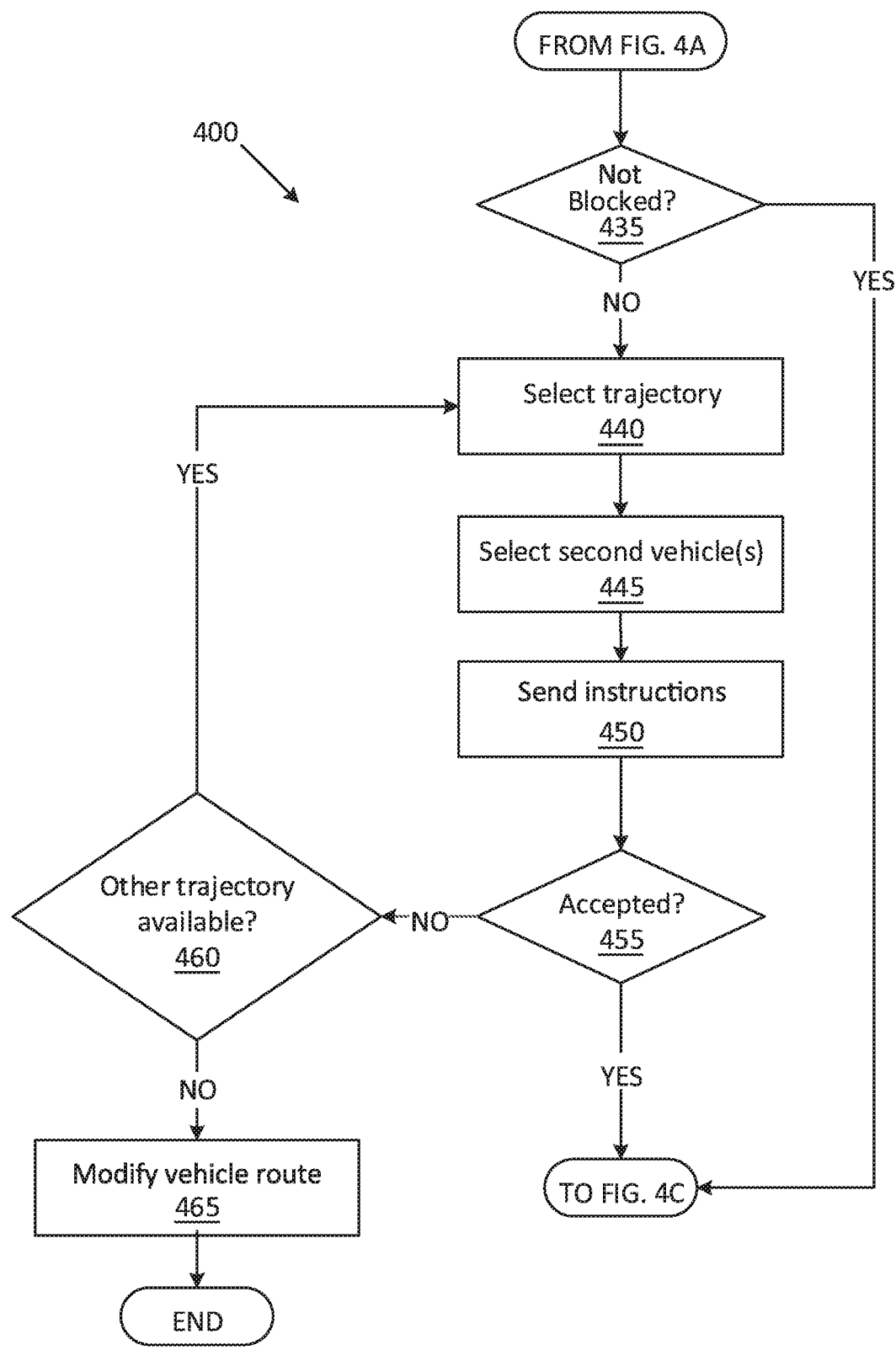
Figure 4C:
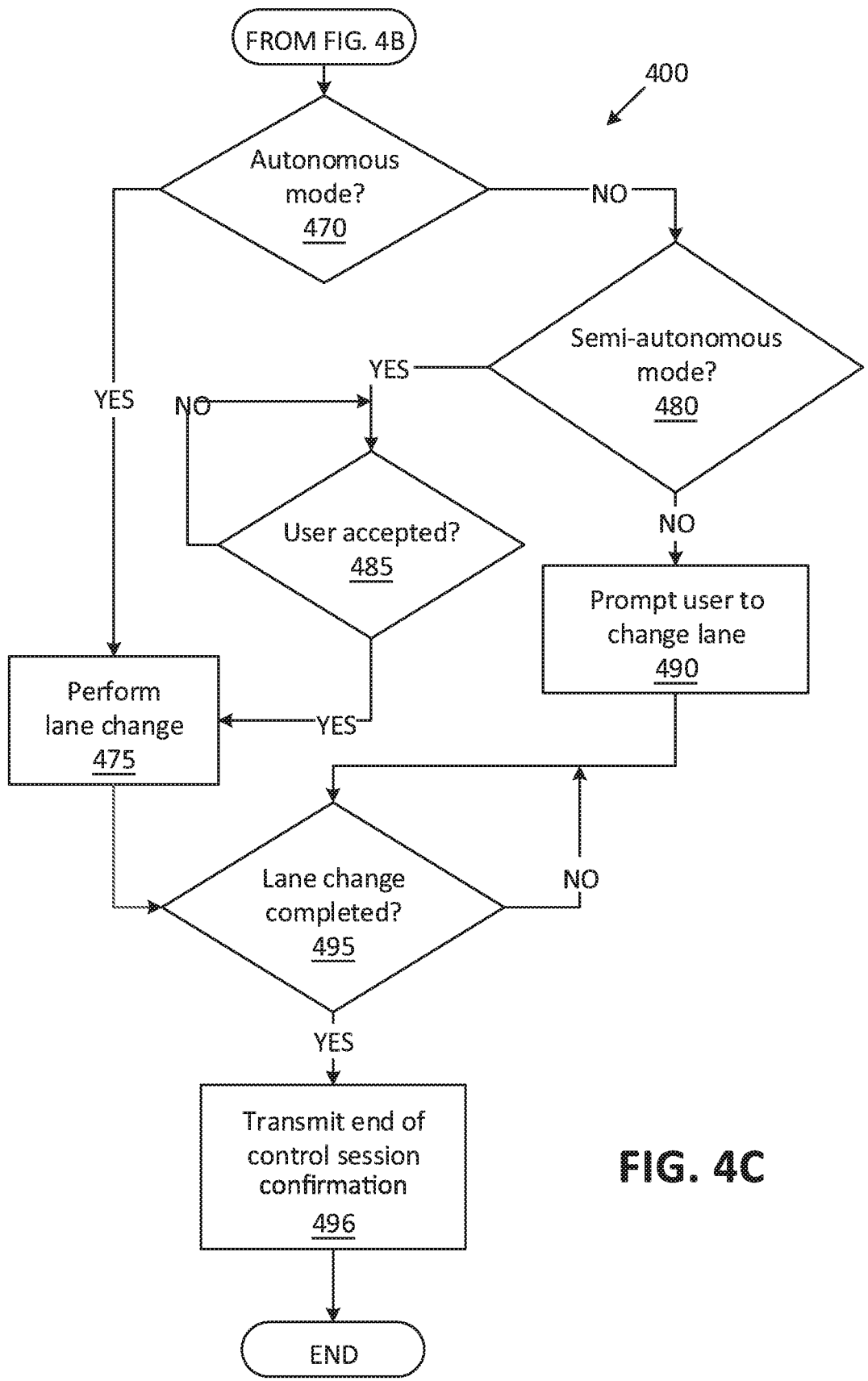

FIGS. 4A-4C show an example process 400 for a host vehicle 100 sending instructions to second vehicle(s) 101 for unblocking a trajectory 230 of the host vehicle 100. In one example, the vehicle 100 computer 110 may be programmed to execute blocks of the process 400.

The process 400 begins in a block 405, in which the computer 110 determines whether the vehicle 100 operates in a manual (or non-autonomous) mode. In one example, the vehicle 100 may be operated in a non-autonomous, autonomous, or semi-autonomous mode. If the computer 110 determines that the vehicle 100 operates in a non-autonomous mode, then the process 400 proceeds to a decision block 410; otherwise the process 400 proceeds to a block 415.

In the decision block 410, the computer 110 determines whether a turn signal is detected. For example, the computer 110 may detect a right or left turn signal following user input to a turn signal lever or the like included in an HMI 140. A right or left turn signal while a vehicle is traveling on a highway typically indicates an intention of a user of a non-autonomously operating vehicle 100 to change to a right or left lane 210. Additionally or alternatively, the computer 110 may be programmed to receive some other input from a vehicle 100 user to the HMI 140 indicating an intention to change a lane 210, e.g., via audio input, gesture detection, etc. Additionally or alternatively, the computer 110 may be programmed to receive input including a request for a plurality of lane changes, e.g., an audio command such as "change two lanes to the left." If the computer 110 determines that the turn signal is received, then the process 400 proceeds to a block 430; otherwise the process 400 returns to the decision block 410.

In the block 415, the computer 110 receives route data such as a current location of the vehicle 100, a destination, traffic data, etc.

Next, in a block 420, the computer 110 identifies a route for the vehicle 100 to the received destination. For example, the computer 110 may identify the route based on the current vehicle 100 location, the received destination, traffic data, etc., using known route planning techniques. The computer 110 may be further programmed to actuate vehicle 100 actuators 120 to operate the vehicle 100, e.g., by accelerating on a road 250, based on the identified route.

Next, in a decision block 425, the computer 110 determines whether a lane change is warranted. For example, the computer 110 may determine that a lane change is warranted based on a current location of the vehicle and the identified route. The vehicle 100 may receive the current location of the vehicle 100 from the vehicle 100 GPS sensor 130. Additionally, the computer 110 may be programmed to determine whether a lane change is warranted based on location coordinates of the vehicle 100 and data received from one or more vehicle 100 camera sensors 130. Additionally or alternatively, the computer 110 may be programmed to determine that a lane change is warranted upon determining that a time-to-collision with an obstacle on the current lane 210 of the host vehicle 100 is less than a time-to-stop the vehicle 100 by braking. In other words, the computer 110 may be programmed to determine that a lane change is needed to prevent a collision of the host vehicle 100 with an obstacle on the host vehicle 100 current lane 210. If the computer 110 determine that the lane change is warranted, then the process 400 proceeds to a block 430; otherwise the process 400 returns to the decision block 425.

In the block 430, the computer 110 determines one or more trajectories 230 based on a location and/or speed of the vehicle 100, a location and/or speed of other vehicles 101 proximate to the vehicle 100, target lane 210, etc. For example, as shown in FIG. 2A, the computer 110 may determine a plurality of trajectories 230, 230a, 230b by determining various longitudinal and lateral movements for the vehicle 110 to travel into the target lane 210. In one example, as described above a plurality of possible trajectories may be determined between a current vehicle 100 location on the current lane 210a and a target location on a target lane 210c, e.g., depending on how the longitudinal and lateral components of the vehicle 100 speed change while the vehicle 100 moves from the current lane 210a to the target lane 210c.

Continuing with the process 400 as illustrated in FIG. 4B, next, in a decision block 435, the computer 110 determines if at least one of the possible determined trajectories is not blocked. The computer 110 may determine that a trajectory is blocked upon determining that, without a modification of a second vehicle 101 speed, the vehicles 100, 101 may impact one another, i.e., collide (see FIG. 2B). In one example, shown in FIG. 2A, the computer 110 may determine based on the second vehicle 101 speed, the vehicle 100 speed, and/or the trajectory 230, that the vehicle 100 may move on the trajectory 230 without any modification of the second vehicle 101 speed. Thus, the computer 110 may determine that the trajectory 230 is not blocked. However, in one example, shown in FIG. 2B, the computer 110 may determine that the trajectory 230a is blocked because without a modification of the second vehicle 101b speed the vehicles 100, 101b may collide. Thus, to move the vehicle 100 on a blocked trajectory, a speed of at least one second vehicle 101 should be modified. If the computer 110 determines that at least one of the possible trajectories is not blocked, then the process 400 proceeds to a block 470 (see FIG. 4C); otherwise the process 400 proceeds to a decision block 440.

Next, in the block 440, the computer 110 selects a trajectory 230 to follow. The computer 110 may be programmed to select a trajectory based on various criteria. In one example, the computer 110 may be programmed to select a trajectory that leads to a least number of second vehicles 101 instructed to modify their speed. Alternatively, or in combination with the foregoing, the computer 110 may be programmed to select a trajectory that leads to least aggregate amount of speed modification of second vehicles 101. For example, if a trajectory 230a needs two vehicles 101 to receive instructions from the host vehicle 100 to adjust their speed, and a trajectory 230b needs only one vehicle 101 to receive instructions from the host vehicle 100, then the computer 110 may be programmed to select the trajectory 230b. Additionally or alternatively, the computer 110 may be programmed to select a trajectory 230 that minimizes a modification of speed to be requested of one or more second vehicles 101. For example, an amount of speed modification may be based on the distance $d_3$. If the vehicle 100 makes a lateral movement to the lane 210b while $d_3$ is 5 meters and a distance threshold is 25 meters, then the second vehicle 101b may be instructed to make a larger speed reduction compared to when the distance $d_3$ is 20 meters. In other words, to achieve a distance $d_5$ that exceeds the distance threshold, the second vehicle 101b speed, when the distance $d_3$ is 5 meters, may be reduced more than when the distance $d_3$ is 20 meters. Continuing this example, if a trajectory 230a may cause 20 km/hr speed reduction of a second vehicle 101 and a trajectory 230b causes 30 km/hr speed reduction for a second vehicle 101, then the computer 110 may be programmed to select the trajectory 230a.

Additionally or alternatively, the computer 110 may be programmed to select a trajectory from the possible trajectories based on an optimization function. For example, a function such as W=aN+bV may be used to represent a weight of a trajectory. W, N, and V in this example respectively represent a weight of a trajectory, a number of second vehicles 101 affected by the respective trajectory 230 (i.e. their speed would be modified), and an aggregate amount of speed modification in second vehicle(s) 101 which is caused by the respective trajectory 230. Parameters a and b may determine a relationship of an input value, i.e., N and V, on the output value W. In one example, the computer 110 may be programmed to select one of the possible trajectories that is associated with a lowest W compared to other possible trajectories. In one example, when the block 440 is reached via a decision block 460, then the computer 110 may be programmed to select a trajectory 230 that has not been selected before.

As discussed with reference to blocks 445, 450, 455, and 460, the computer 110 may be programmed to evaluate one by one each of, e.g., the trajectories 230, 230a, 230b, to determine which of the trajectories 230, 230a, 230b can be unblocked based on a refusal or acceptance reply of the second vehicles 101. The computer 110 may be programmed, as discussed above, to select a preferred trajectory, e.g., the trajectory with lowest W, and if the second vehicles 101 associated with that trajectory (i.e., the second vehicles 101 which are instructed to modify their speed) refuses to follow the instruction, the computer 110 may be programmed to select other determined trajectories 230, 230a, 230b.

Next, in a block 445, the computer 110 identifies one or more second vehicles 101 to receive instructions based on the selected trajectory 230. For example, based on selecting the trajectory 230a, the computer 110 may be programmed to identify the second vehicle 101b to receive an instruction to reduce the second vehicle 101b speed.

Next, in a block 450, the computer 110 sends one or more instructions to the selected second vehicle(s) 101. For example, with reference to FIGS. 2A-2B, the computer 110 may be programed to send an instruction to the second vehicle 101b to reduce the second vehicle 101b speed. The instruction may include a target speed, e.g., 35 km/hr, and an identifier such as vehicle identification number (VIN), license plate number, etc., of the selected second vehicle 101b. Additionally or alternatively, the computer 110 may be programmed to send a target speed pattern such as a pattern shown in FIG. 3 to the selected second vehicle 101b.

Yet further additionally or alternatively, the computer 110 may be programmed to send a time-to-collision between the host vehicle 100 and an obstacle in the current lane 210 of the host vehicle 100. In other words, the computer 110 may inform the second vehicle 101 about an urgency of the requested speed modification. For example, the second vehicle 101 may be programmed to change one or more thresholds associated with determining whether to accept an instruction from the vehicle 100. The second vehicle 100 computer 110 may be programmed to refuse a modification of the second vehicle 100 speed when the modified speed exceeds a maximum allowed speed limit and no urgency is indicated by the vehicle 100. However, the second vehicle 101 computer 110 may be programmed to accept a modification of the second vehicle 101 speed even when the target speed exceeds the maximum allowed speed limit if the received instruction includes a binary flag, set to "yes," or "1" or the like, indicating an urgency of the vehicle 100 to change from the lane 210a to the lane 210b. In one example, the instruction may include a time-to-collision and a time-to-stop of the vehicle 100.

Next, in a decision block 455, the computer 110 determines whether the selected second vehicle(s) 101 accepted the sent instruction(s), e.g., based on acceptance or refusal messages received via V-to-V communications. In one example, the computer 110 may be programmed to determine that the instruction(s) is(are) accepted upon determining that each of selected second vehicles 101 accepted the instructions. In other words, if at least one of the selected second vehicles 101 refuses to accept the received instruction, then, for purposes of the block 455, the vehicle 100 computer 110 may be programmed to determine that all of the second vehicles 101 refused the instructions, i.e., the determination of the block 455 is negative. For example, with reference to the FIG. 2A, if the second vehicle 101c accepts, whereas the second vehicle 101b refuses to accept, then the vehicle 100 computer 110 may determine that, collectively, the second vehicles 101 associated with the selected trajectory 230 refused the received instructions, e.g., because the vehicle 100 may not move on the trajectory 230 due to a possibility of impact with the refusing second vehicle 101b. If the vehicle 100 computer 110 determines that the second vehicles 101 accepted the received instructions, then the process 400 proceeds to a decision block 470 (see FIG. 4C); otherwise the process 400 proceeds to a decision block 460.

In the decision block 460, the computer 110 determines whether any other trajectory 230 is available. In one example, the computer 110 may be programmed to determine that another trajectory is available upon determining that at least one of the trajectories has not previously been provided to one or more second vehicles 101 for acceptance or refusal. For example, the computer 110 may be programmed to determine that no other trajectory 230 is available upon determining that all of determined trajectories 230 have been already refused (see the decision block 455). If the computer 110 determines that another trajectory 230 is available, then the process 400 proceeds to the block 440; otherwise the process 400 proceeds to a block 465.

In the block 465, the computer 110 modifies the vehicle 100 route based on the inability to select a trajectory for a lane change. In a non-autonomous and/or semi-autonomous mode, the computer 110 may be programmed to identify an alternative route to the received destination and operate the vehicle 100 based on the identified alternative route. In another example, when the vehicle 100 is operated in semi-autonomous and/or autonomous mode, a reduction of the vehicle 100 speed may lead to determining new possible trajectories, e.g., because the second vehicles 101 which block the trajectories may pass by. Thus, in one example, the computer 110 may be programmed to decelerate and return to the block 430, although not shown in FIG. 4B. In another example, in a non-autonomous mode, the computer 110 may be programmed to output a message via the vehicle 100 HMI 140 indicating that the target lane is blocked. The vehicle 100 user may then identify a different route. Following the block 465, the process 400 ends; or alternatively returns to the block 405, although not shown in FIG. 4B.

Turning to FIG. 4C, in the decision block 470, the computer 110 determines whether the vehicle 100 is operating in the autonomous mode. If the computer 110 determines that the vehicle 100 operates in the autonomous mode, then the process 400 proceeds to a block 475; otherwise the process 400 proceeds to a decision block 480.

In the block 475, the computer 110 performs the lane change based on the selected trajectory 230, e.g., by actuating the vehicle 100 actuators 120, e.g., steering. In one example, the computer 110 may be further programmed to perform the lane change upon determining that the selected second vehicle(s) 101 performed the instructions, e.g., based on change of the second vehicle(s) 101 speed.

In the decision block 480, the computer 110 determines whether the vehicle 100 is operating in a semi-autonomous mode. If the computer 110 determines that the vehicle 100 is operated in a semi-autonomous mode, then the process 400 proceeds to a decision block 485; otherwise the process 400 proceeds to a block 490.

In the decision block 485, the computer 110 determines whether a vehicle 100 user accepted the lane change based on the selected trajectory 230. In one example, the computer 110 is programmed to output information including a proposed lane change based on the selected trajectory 230, e.g., via a graphical display showing an arrow in a direction of the selected trajectory 230, via the vehicle 100 HMI 140. The computer 110 may be programmed to receive an entry, e.g., via the vehicle 100 HMI 140, including a decision of the user to accept or refuse the proposed lane change. If the computer 110 determines that the vehicle 100 user accepted the proposed lane change, then the process 400 proceeds to the block 475; otherwise the process 400 returns to the decision block 485.

In the block 490, the vehicle 100 having been determined to be in the manual mode, the computer 110 prompts the vehicle 100 user to change the lane. For example, the computer 110 may actuate the vehicle 100 HMI 140 to output information, e.g., a blinking green lamp, to indicate that the user may change the lane 210 in the proposed direction such as the direction of received turn signal. The block 490 may be reached when the vehicle 100 is operated in the non-autonomous mode. Thus, the vehicle 100 user may actuate a vehicle 100 actuator 120 to change the lane 210.

Next, in a decision block 495, the computer 110 determines whether the lane change is completed, or the selected trajectory 230 has been travelled by the vehicle 100, e.g., the vehicle 100 has reached the lane 210c, with reference to the trajectory 230 shown in FIG. 2A. The computer 110 may be programmed to determine whether the lane change is completed based on data received from the vehicle 100 sensors 130, e.g., the GPS sensor 130, the camera sensor 130, etc. If the computer 110 determines that the lane change is completed and/or the selected trajectory 230 is travelled, then the process 400 proceeds to a block 496; otherwise the process 400 returns to the decision block 495.

In the block 496, the computer 110 transmits a message confirming an end of the control session. For example, the computer 110 may be programmed to transmit a message via the wireless communication interface 160 including an identifier of the selected second vehicle(s) 101 and information confirming that the vehicle 100 ends a modification of speed of the selected second vehicles 101.

Following the block 496, the process 400 ends; or, returns to the block 405, although not shown in FIG. 4C.

Figure 5:
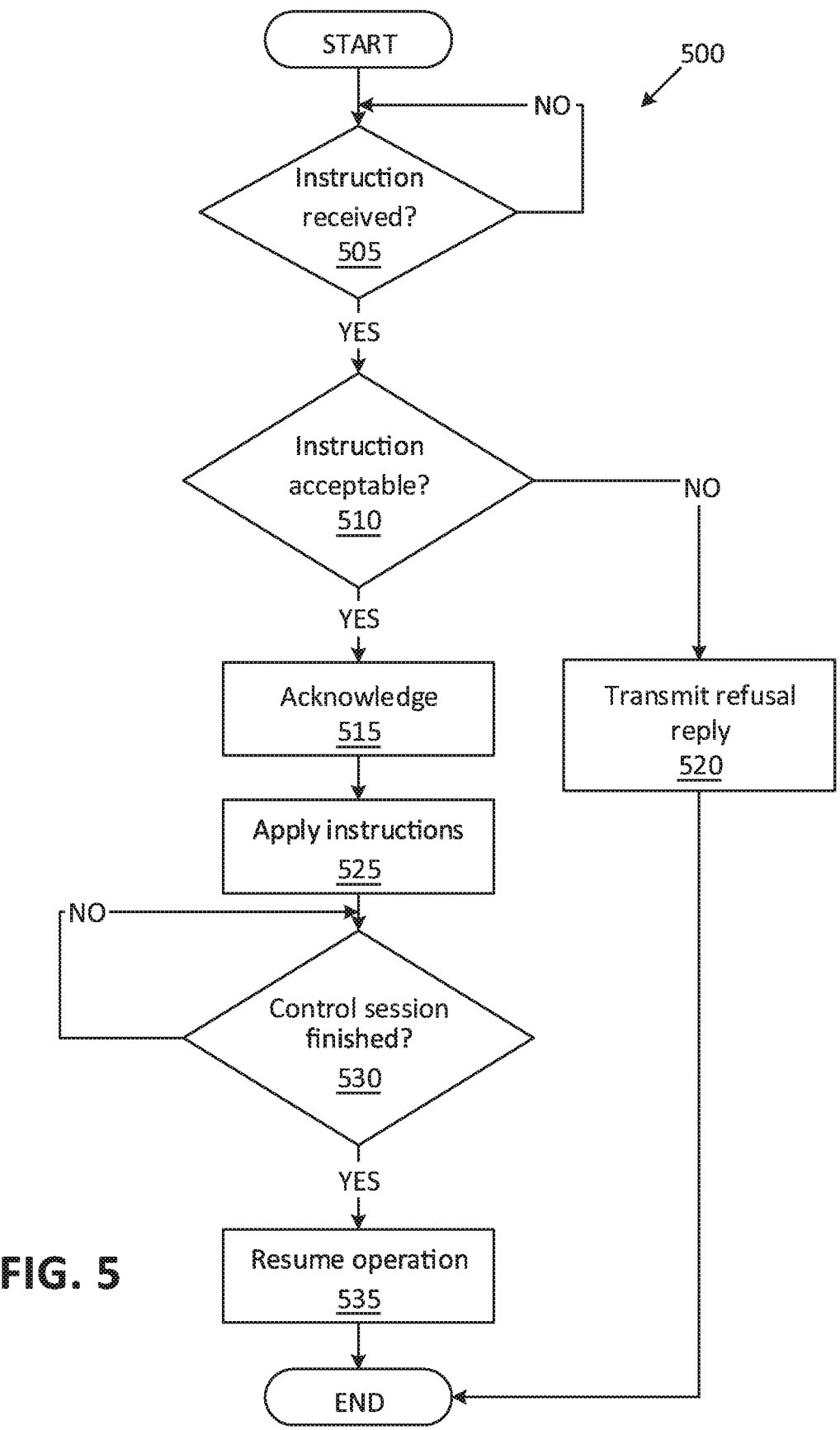
FIG. 5 is a flowchart of an exemplary process for a client vehicle receiving instructions from a host vehicle.

FIG. 5 shows an example process 500 for a second vehicle 101 receiving instructions from a host vehicle 100. For example, a second vehicle 101 computer 110 may be programmed to execute blocks of the process 500.

The process 500 begins in a decision block 505, in which the second vehicle 101 computer 110 determines whether an instruction is received from a host vehicle 100, e.g., via a second vehicle 101 wireless communication interface 160. If the second vehicle 101 computer 110 determines that the instruction is received from the host vehicle 100, then the process 500 proceeds to a decision block 510; otherwise the process 500 returns to the decision block 505.

In the decision block 510, the second vehicle 101 computer 110 determines whether the received instruction is acceptable. For example, the second vehicle 101 computer 110 may be programmed to determine whether the received instruction is acceptable based on the target speed, a predetermined target speed threshold, a predetermined acceleration threshold, a time-to-collision of the host vehicle on the current lane 210 of the host vehicle 00, etc. If the computer 110 determines that the received instruction is acceptable, then the process 500 proceeds to a block 515; otherwise the process 500 proceeds to a block 520.

In the block 515, the computer 110 sends an acceptance message to the host vehicle 100, e.g., via the second vehicle 101 wireless communication interface 160.

In the block 520, the second vehicle 101 computer 110 transmits a refusal message to the host vehicle 100, e.g., via the second vehicle 101 wireless communication interface 160. Following the block 520, the process 500 ends; or, alternatively returns to the decision block 505 (although not shown in FIG. 5).

Following the block 515, in a block 525, the second vehicle 101 computer 110 applies the received instruction, e.g., by actuating the second vehicle 101 actuators 120. For example, the second vehicle 101 computer 110 actuates the second vehicle 101 propulsion and/or braking actuators 120 to modify the second vehicle 101 speed to the received target speed and/or target speed pattern.

Next, in a decision block 530, the second vehicle 101 computer 110 determines whether the control session is finished, i.e., whether the host vehicle 100 intends to further modify the second vehicle 101 speed. For example, the second vehicle 101 computer 110 may be programmed to determine that the control session is finished upon receiving a message, e.g., via V-to-V communications, from the host vehicle 100 confirming that the control session is finished. If the computer 110 determines that control session is finished, then the process 500 proceeds to a block 535; otherwise the process 500 returns to the decision block 530; or, alternatively returns to the decision block 505, although not shown in FIG. 5.

In the block 535, the computer 110 resumes operation of the second vehicle 101 based on, e.g., a second vehicle 101 planned speed. For example, the computer 110 of the second vehicle 101 may be programmed to modify the speed of the second vehicle 101 to reach a speed planned by the second vehicle 101 computer 110 different from the target speed instructed by the host vehicle 100.

Following the block 535, the process 500 ends.

The article "a" modifying a noun should be understood as meaning one or more unless stated otherwise, or context requires otherwise. The phrase "based on" encompasses being partly or entirely based on.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A computer for a first vehicle that includes at least one of an autonomous or a semi-autonomous mode, programmed to:
   determine a first trajectory for the first vehicle to change from a first lane to a second lane;
   upon determining that a second vehicle blocks the first trajectory including the change from the first lane to the second lane, determine a speed adjustment for the second vehicle that will allow the first vehicle to proceed on the first trajectory to change from the first lane to the second lane; and
   send, via wireless vehicle-to-vehicle communications, to a second computer in the second vehicle, an instruction based on the determined first trajectory of the first vehicle, a second vehicle location, and a second vehicle speed, wherein the instruction includes an identifier of the second vehicle and at least one target speed for the second vehicle, the target speed determined according to the speed adjustment for the second vehicle that will allow the first vehicle to proceed on the first trajectory to change from the first lane to the second lane.

2. The computer of claim 1, further programmed to operate the first vehicle in the autonomous or semi-autonomous mode according to the first trajectory.

3. The computer of claim 1, further programmed to determine the second vehicle speed and the second vehicle location based on data received from first vehicle sensors.

4. A method, for a first vehicle that includes at least one of an autonomous or a semi-autonomous mode, comprising:
   determining a first trajectory for the first vehicle to change from a first lane to a second lane; and
   upon determining that a second vehicle blocks the first trajectory including the change from the first lane to the second lane, determining a speed adjustment for the second vehicle that will allow the first vehicle to proceed on the first trajectory to change from the first lane to the second lane;
   sending, via wireless vehicle-to-vehicle communications, to a second computer in the second vehicle, an instruction based on the determined first trajectory of the first vehicle, a second vehicle location, and a second vehicle speed, wherein the instruction includes an identifier of the second vehicle and at least one target speed for the second vehicle, the target speed determined according to the speed adjustment for the second vehicle that will allow the first vehicle to proceed on the first trajectory to change from the first lane to the second lane.

5. The computer of claim 1, wherein the first trajectory of the first vehicle includes a curvature intersecting at least one road lane marking.

6. The computer of claim 1, further programmed to determine the first trajectory based on a predetermined route.

7. The computer of claim 1, further programmed to determine the first trajectory based on activation of a first vehicle turn signal.

8. The computer of claim 1, further programmed to:
   upon receiving a refusal from the second vehicle to modify its speed, determine a second trajectory of the first vehicle;
   identify a third vehicle that blocks the second trajectory; and
   send, to the third vehicle, a second instruction to adjust a third vehicle speed based on the second trajectory, a second vehicle location, and a second vehicle speed.

9. The computer of claim 1, further programmed to send a plurality of instructions to a plurality of second vehicles, wherein each of the instructions is associated with one of the plurality of second vehicles and is based at least on a speed and a location of the respective second vehicle.

10. The method of claim 4, further comprising determining the second vehicle speed and the second vehicle location based on data received from first vehicle sensors.

11. The method of claim 4, wherein the first trajectory of the first vehicle includes a curvature intersecting at least one road lane marking.

12. The method of claim 4, further comprising determining the first trajectory based on a predetermined route.

13. The method of claim 4, further comprising determining the first trajectory based on activation of a first vehicle turn signal.

14. The method of claim 4, further comprising:
   upon receiving a refusal from the second vehicle to modify its speed, determining a second trajectory of the first vehicle;
   identifying a third vehicle that blocks the second trajectory; and
   sending, to the third vehicle, a second instruction to adjust a third vehicle speed based on the second trajectory, a second vehicle location, and a second vehicle speed.

15. The method of claim 4, further comprising sending a plurality of instructions to a plurality of second vehicles, wherein each of the instructions is associated with one of the plurality of second vehicles and is based at least on a speed and a location of the respective second vehicle.

16. The method of claim 4, further comprising:
determining, in the second vehicle, whether to accept the received instruction based on at least one of a second vehicle target speed and a time-to-collision of the first vehicle;
applying the received instruction by actuating second vehicle operations, upon determining that the received instruction is acceptable, actuating a second vehicle actuator based on the received instruction.

17. The method of claim 4, further comprising operating the first vehicle in the autonomous or semi-autonomous mode according to the first trajectory.

* * * * *